(12) United States Patent
Lyu et al.

(10) Patent No.: US 11,212,154 B2
(45) Date of Patent: Dec. 28, 2021

(54) SIGNAL SENDING METHOD, NETWORK DEVICE, AND TERMINAL DEVICE

(71) Applicant: Huawei Technologies Co., Ltd., Shenzhen (CN)

(72) Inventors: Yongxia Lyu, Shanghai (CN); Zhiheng Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/028,634

(22) Filed: Sep. 22, 2020

(65) Prior Publication Data

US 2021/0067398 A1    Mar. 4, 2021

Related U.S. Application Data

(63) Continuation of application No. 16/272,084, filed on Feb. 11, 2019, now Pat. No. 10,819,550, which is a
(Continued)

(30) Foreign Application Priority Data

Aug. 12, 2016    (CN) .......................... 201610664562.5

(51) Int. Cl.
*H04L 27/26*    (2006.01)
*H04L 5/00*    (2006.01)
(Continued)

(52) U.S. Cl.
CPC .......... *H04L 27/2657* (2013.01); *H04J 1/065* (2013.01); *H04L 5/0023* (2013.01);
(Continued)

(58) Field of Classification Search
CPC . H04L 27/2657; H04L 5/0023; H04L 5/0039; H04L 5/0044; H04L 5/0007;
(Continued)

(56) References Cited

U.S. PATENT DOCUMENTS 10,212,679 B1 *  2/2019  Suresh ................ H04L 25/0216
10,298,304 B2 *  5/2019  Lim ........................ H04B 7/066
(Continued)

FOREIGN PATENT DOCUMENTS

CN    101331692 A    12/2008
CN    101636992 A     1/2010
(Continued)

OTHER PUBLICATIONS

Dahlman, E. et al., All about 4G LTE/LTE-Advanced, the last volume, 4G:LTE/LTE-Advanced for Mobile Broadband, Second Edition, Maruzen Publishing Co., Ltd., Oct. 20, 2015, pp. 381-393, with an English translation, 39 pages.
(Continued)

*Primary Examiner* — Jaison Joseph
(74) *Attorney, Agent, or Firm* — Slater Matsil, LLP

(57)    ABSTRACT

A signal receiving method, an apparatus and a communication system. The network device determines a subcarrier location of a to-be-sent first signal and a subcarrier location of a to-be-sent second signal, where subcarriers occupied by the first signal are continuous subcarriers in a first group of resource elements, subcarriers occupied by the second signal are continuous subcarriers in a second group of resource elements, a quantity of the subcarriers occupied by the first signal is the same as a quantity of the subcarriers occupied by the second signal, and a subcarrier spacing in the first group of resource elements is different from a subcarrier spacing in the second group of resource elements, the first signal and the second signal are primary synchronization signals. The network device sends the first signal to the terminal device and sends the second signal to the terminal device or other terminal device.

20 Claims, 8 Drawing Sheets

Related U.S. Application Data continuation of application No. PCT/CN2017/096221, filed on Aug. 7, 2017.

(51) Int. Cl.
*H04J 1/06* (2006.01)
*H04J 11/00* (2006.01)
*H04J 13/00* (2011.01)

(52) U.S. Cl.
CPC .......... *H04L 5/0039* (2013.01); *H04L 5/0044* (2013.01); *H04L 27/26* (2013.01); *H04L 27/2613* (2013.01); *H04L 27/2666* (2013.01); *H04J 11/0073* (2013.01); *H04J 11/0076* (2013.01); *H04J 13/0062* (2013.01); *H04L 5/0007* (2013.01); *H04L 5/0048* (2013.01)

(58) Field of Classification Search
CPC . H04L 5/0048; H04L 27/026; H04L 27/2613; H04L 27/2666; H04J 1/065; H04J 11/0076; H04J 13/0062
See application file for complete search history.

(56) References Cited

U.S. PATENT DOCUMENTS

| | | | |
|---|---|---|---|
| 10,903,957 B2 * | 1/2021 | Ko | H04L 5/0094 |
| 2007/0258357 A1 | 11/2007 | Akita | |
| 2008/0205351 A1 | 8/2008 | Lindoff et al. | |
| 2013/0315324 A1 | 11/2013 | Wang et al. | |
| 2016/0277225 A1 * | 9/2016 | Frenne | H04L 27/261 |
| 2017/0265091 A1 * | 9/2017 | Yan | H04B 7/0632 |
| 2018/0041318 A1 * | 2/2018 | Sudo | H04L 27/2613 |
| 2018/0048436 A1 * | 2/2018 | Park | H04W 52/146 |
| 2018/0262900 A1 | 9/2018 | Moon et al. | |
| 2018/0278386 A1 * | 9/2018 | Shim | H04W 72/042 |
| 2019/0132824 A1 * | 5/2019 | Jeon | H04L 5/0092 |
| 2019/0149257 A1 * | 5/2019 | Jiang | H04L 5/0094 370/342 |
| 2019/0173719 A1 * | 6/2019 | Qin | H04L 27/26 |
| 2019/0245730 A1 * | 8/2019 | Yi | H04L 27/26 |

FOREIGN PATENT DOCUMENTS

| | | |
|---|---|---|
| CN | 104796242 A | 7/2015 |
| JP | 2019516256 A | 6/2019 |
| WO | 2014139562 A1 | 9/2014 |
| WO | 2017188664 A1 | 11/2017 |

OTHER PUBLICATIONS

Catt, "NR Numerology Agnostic Synchronization Channel Design", 3GPP TSG RAN WG1 #86bis R1-1608783, Lisbon, Portugal, Oct. 10-14, 2016, 4 pages.

Nokia et al.,"Initial Synch Signal Performance Results", 3GPP TSG-RAN WG1 #86 Bis R1-1610290, Lisbon, Portugal, Oct. 10-14, 2016, 6 pages.

"Scenario & Design Criteria on Flexible Numerologies," Agenda Item: 8.1.5, Source: Huawei, HiSilicon, Document for: Discussion and decision, R1-162156, 3GPP TSG RAN WG1 Meeting #84bis, Busan, Korea, Apr. 11-15, 2016, 7 pages.

"Discussion on Numerology and Frame Structure," Agenda Item: 8.1.5, Source: Spreadtrum Communications, Document for: Discussion, R1-162549, 3GPP TSG RAN WG1 meeting #84 bis, Busan, Korea, Apr. 11-15, 2016, 6 pages.

"Initial Access in NR," Agenda Item: 9.4.3.2.4, Source: Huawei, HiSilicon, Document for: Discussion and Decision, 3GPP TSG-RAN W2 Meeting #94, R2-163923, Nanjing, China, May 23-27, 2016, 4 pages.

NTT DoCoMo, Fujitsu, Institute for Infocomm Research, NEC, Panasonic, Toshiba Corporation, Multiplexing Method of SCH for E-UTRA Downlink. 3GPP TSG RAN WG1 Meeting #46bis, R1-062721, Seoul, Korea, Oct. 9-13, 2006, 9 pages.

\* cited by examiner

```
                                                    ┌──────────┐
                                                    │          │
A network device determines a subcarrier location of a to-be-sent first signal
and a subcarrier location of a to-be-sent second signal, where subcarriers
occupied by the first signal are continuous subcarriers in a first group of
resource elements, subcarriers occupied by the second signal are continuous
  subcarriers in a second group of resource elements, a quantity of the         ╱  301
 subcarriers occupied by the first signal is the same as a quantity of the
 subcarriers occupied by the second signal, a subcarrier spacing in the first
group of resource elements is different from a subcarrier spacing in the second
     group of resource elements, and the first signal and the second signal are
                        primary synchronization signals
```

▼

The network device determines a subcarrier location of a to-be-sent third signal
and a subcarrier location of a to-be-sent fourth signal, where subcarriers
occupied by the third signal are continuous subcarriers in a third group of
resource elements, subcarriers occupied by the fourth signal are continuous
subcarriers in a fourth group of resource elements, a quantity of the subcarriers      ╱ 302
occupied by the third signal is the same as a quantity of the subcarriers
occupied by the fourth signal, a subcarrier spacing in the third group of
resource elements is the same as the subcarrier spacing in the first group of
resource elements, a subcarrier spacing in the fourth group of resource
elements is the same as the subcarrier spacing in the second group of resource
elements, and the third signal and the fourth signal at least include secondary
synchronization signals

▼

The network device determines a subcarrier location of a to-be-sent fifth signal
and a subcarrier location of a to-be-sent sixth signal, where subcarriers
occupied by the fifth signal are continuous subcarriers in a fifth group of
resource elements, subcarriers occupied by the sixth signal are continuous            ╱ 303
subcarriers in a sixth group of resource elements, a quantity of the subcarriers
occupied by the fifth signal is the same as a quantity of the subcarriers
occupied by the sixth signal, a subcarrier spacing in the fifth group of resource
elements is the same as the subcarrier spacing in the first group of resource
elements and/or the third group of resource elements, a subcarrier spacing in
the sixth group of resource elements is the same as the subcarrier spacing in the
second group of resource elements and/or the fourth group of resource
elements, and the fifth signal and the sixth signal are first broadcast channel
signals or first system information block signals

CONT.
FROM
FIG. 3A

| The network device sends the first signal at the determined subcarrier location of the first signal, sends the second signal at the determined subcarrier location of the second signal, sends the third signal at the determined subcarrier location of the third signal, sends the fourth signal at the determined subcarrier location of the fourth signal, sends a fifth signal at the determined subcarrier location of the fifth signal, and sends the sixth signal at the determined subcarrier location of the sixth signal | 304 |

| The terminal device performs synchronization or cell search based on the first signal and/or the third signal, and receives the fifth signal for demodulation and decoding; or the terminal device performs synchronization or cell search based on the second signal and/or the fourth signal, and receives the sixth signal for demodulation and decoding | 305 |

FIG. 3B

SIGNAL SENDING METHOD, NETWORK DEVICE, AND TERMINAL DEVICE

CROSS-REFERENCE TO RELATED APPLICATIONS

This application is a continuation of U.S. patent application Ser. No. 16/272,084, filed on Feb. 11, 2019, which is a continuation of International Application No. PCT/CN2017/096221, filed on Aug. 7, 2017, which claims priority to Chinese Patent Application No. 201610664562.5, filed on Aug. 12, 2016. All of the afore-mentioned patent applications are hereby incorporated by reference in their entireties.

TECHNICAL FIELD

This application relates to the communications field, and in particular, to a signal sending method, a network device, and a terminal device.

BACKGROUND

Conventional digital signal transmission is a serial transmission manner, because an information flow is transmitted at a time through a channel. A multicarrier technology uses a parallel transmission manner, in which serial-to-parallel conversion is performed on a serial high-speed information flow, and then divided into a plurality of parallel low-speed information flows, and then the plurality of parallel low-speed information flows are superposed for transmission, thereby forming a multicarrier transmission system. That is, the multicarrier technology is a technology for transmitting high-speed data information by using a plurality of carriers. A carrier is a radio wave that carries data and has a specific frequency.

A multicarrier transmission technology has been widely applied to communications systems, for example, a fourth generation (4G) communications system and a wireless local area network standard 802.11 series system. In a current communications system, a service supported by each system is relatively unified, and each communications system supports only a wave with one type of subcarrier spacing. In a future fifth generation (5G) communications system, a serving cell of a network device may support a plurality of subcarrier spacings, so that the serving cell may serve terminal devices with different requirements by using different signals with different subcarrier spacings in different services and different deployment scenarios.

However, how to send a signal by the network device to enable a terminal device to access a system that supports a plurality of subcarrier spacings is an urgent problem to be resolved.

SUMMARY

Embodiments of the present invention provide a signal sending method, a network device, and a terminal device, so as to resolve a problem of how to send a signal by the network device to enable a terminal device to access a system that supports a plurality of subcarrier spacings.

According to one aspect, a signal sending method is provided, including determining, by a network device, a subcarrier location of a to-be-sent first signal and a subcarrier location of a to-be-sent second signal, where subcarriers occupied by the first signal are continuous subcarriers in a first group of resource elements, subcarriers occupied by the second signal are continuous subcarriers in a second group of resource elements, a quantity of the subcarriers occupied by the first signal is the same as a quantity of the subcarriers occupied by the second signal, and a subcarrier spacing in the first group of resource elements is different from a subcarrier spacing in the second group of resource elements, and sending, by the network device, the first signal at the determined subcarrier location of the first signal, and sending the second signal at the determined subcarrier location of the second signal. The network device may be a base station, a terminal device may be user equipment, and the first signal and the second signal may be synchronization signals. In this way, when the first signal and the second signal may be used for time-frequency synchronization or cell search, the terminal device may obtain related information that is used for cell access, so as to support the terminal device in accessing cells with different subcarrier spacings or communicating with the network device by using time-frequency resources with different subcarrier spacings. This can resolve a problem of how to send a signal by the network device to enable a terminal device to access a system that supports a plurality of subcarrier spacings.

In a possible design, the first signal and the second signal are synchronization signals, the continuous subcarriers do not include a zeroth subcarrier, the first group of resource elements and the second group of resource elements occupy a same quantity of symbols or different quantities of symbols in time domain, and occupy one symbol or at least two consecutive symbols in time domain. For example, the first signal and the second signal are primary synchronization signals, and when the first group of resource elements and the second group of resource elements occupy a same quantity of symbols or different quantities of symbols, because a same time domain resource exists, the network device may simultaneously send the first signal and the second signal, so that terminal devices that support different subcarriers may receive a primary synchronization signal that is appropriate for the terminal devices.

In a possible design, a correspondence between a sequence number of a subcarrier in the first group of resource elements and a modulation symbol or a sequence element of the first signal is the same as a correspondence between a sequence number of a subcarrier in the second group of resource elements and a modulation symbol or a sequence element of the second signal. The modulation symbol is a complex symbol that is obtained through modulation and mapping, a complex symbol is mapped to a resource element, and a sequence of the complex symbol is corresponding to a sequence number of a subcarrier corresponding to the resource element. When the sequence element may be understood as a to-be-sent and unmodulated sequence signal, for example, when the signal is a Zadoff-chu sequence signal, one element in the sequence is mapped to one resource element, and a correspondence between the sequence and the sequence number of the subcarrier in which the resource element is located may make mapping between the signal and the resource element simpler.

In a possible design, before the sending, by the network device, the first signal and the second signal, the method further includes determining, by the network device, a subcarrier location of a to-be-sent third signal and a subcarrier location of a to-be-sent fourth signal, where subcarriers occupied by the third signal are continuous subcarriers in a third group of resource elements, subcarriers occupied by the fourth signal are continuous subcarriers in a fourth group of resource elements, a quantity of the subcarriers occupied by the third signal is the same as a quantity of the subcarriers occupied by the fourth signal, a subcarrier spacing in the third group of resource elements is the same as the subcarrier spacing in the first group of resource elements, a subcarrier spacing in the fourth group of resource elements is the same as the subcarrier spacing in the second group of resource elements, the first signal and the second signal are the primary synchronization signals, and the third signal and the fourth signal include at least secondary synchronization signals. In this way, the terminal device can detect the primary synchronization signal accurately and quickly, and perform detection on the secondary synchronization signal under the premise that the primary synchronization signal is known, so as to obtain a cell ID based on the primary synchronization signal and the secondary synchronization signal. Further, a complete or partial system frame number may be obtained.

In a possible design, a correspondence between a sequence number of a subcarrier in the third group of resource elements and a modulation symbol or a sequence element of the third signal is the same as a correspondence between a sequence number of a subcarrier in the fourth group of resource elements and a modulation symbol or a sequence element of the fourth signal, so that the mapping between the signal and the resource element becomes simpler.

In a possible design, before the network device sends the third signal and the fourth signal, the method further includes determining, by the network device, a subcarrier location of a to-be-sent fifth signal and a subcarrier location of a to-be-sent sixth signal, where subcarriers occupied by the fifth signal are continuous subcarriers in a fifth group of resource elements, and subcarriers occupied by the sixth signal are continuous subcarriers in a sixth group of resource elements, a quantity of the subcarriers occupied by the fifth signal is the same as a quantity of the subcarriers occupied by the sixth signal, a subcarrier spacing in the fifth group of resource elements is the same as the subcarrier spacing in the first group of resource elements and/or the third group of resource elements, a subcarrier spacing in the sixth group of resource elements is the same as the subcarrier spacing in the second group of resource elements and/or the fourth group of resource elements, and the fifth signal and the sixth signal are first broadcast channel signals or first system information block signals. In this way, the terminal device obtains necessary information required by a subsequent access process, for example, the first broadcast channel signals or the first system information block signals include parameters such as measurement pilot sending information, a random access signal sending sequence, a random access signal sending resource, and system bandwidth.

In a possible design, a location of a resource element that carries a data signal of the fifth signal and that is in the fifth group of resource elements is the same as a location of a resource element that carries a data signal of the sixth signal and that is in the sixth group of resource elements, and a location of a resource element that carries a pilot signal of the fifth signal and that is in the fifth group of resource elements is the same as a location of a resource element that carries a pilot signal of the sixth signal and that is in the sixth group of resource elements, and the resource element is a frequency domain resource in a unit symbol.

In a possible design, at least two groups of resource elements in the first group of resource elements, the third group of resource elements, and the fifth group of resource elements occupy different frequency domain resources on a same time domain resource, and at least two groups of resource elements in the second group of resource elements, the fourth group of resource elements, and the sixth group of resource elements occupy different frequency domain resources on a same time domain resource. This is because the fifth signal and the sixth signal not only include a sequence signal, that is, a data signal, but also include a pilot signal, so that the mapping between the resource element and the signal becomes simpler.

In a possible design, on a time domain resource occupied by at least one group of resource elements in the first group of resource elements, the third group of resource elements, and the fifth group of resource elements, a seventh signal occupies a subcarrier in a frequency domain resource different from the frequency domain resource occupied by at least one group of resource elements in the first group of resource elements, the third group of resource elements, and the fifth group of resource elements. The seventh signal is a second broadcast channel signal or second system information block signal, and a time domain resource occupied by the seventh signal is greater than or equal to a time domain resource occupied by at least one of the first signal, the third signal, and the fifth signal. That is, the first signal, the third signal, the fifth signal, and the seventh signal are frequency division signals on a same time domain resource. The second broadcast channel signal or the second system information block signal may carry other information, for example, random access configuration information.

In a possible design, the at least two groups of resource elements in the first group of resource elements, the third group of resource elements, and the fifth group of resource elements may be located at a first carrier, the at least two groups of resource elements in the second group of resource elements, the fourth group of resource elements, and the sixth group of resource elements may be located at a second carrier, and the first carrier and the second carrier occupy different frequency domain resources. This helps terminal devices supporting different subcarriers receive a required signal in a corresponding carrier.

In a possible design, the first group of resource elements occupies at least one frequency domain resource unit in the first carrier, the second group of resource elements occupies at least one frequency domain resource unit in the second carrier, and a sequence number of the frequency domain resource unit that is occupied by the first group of resource elements in the first carrier is the same as a sequence number of the frequency domain resource unit that is occupied by the second group of resource elements in the second carrier, the third group of resource elements occupies at least one frequency domain resource unit in the first carrier, the fourth group of resource elements occupies at least one frequency domain resource unit in the second carrier, and a sequence number of the frequency domain resource unit that is occupied by the third group of resource elements in the first carrier is the same as a sequence number of the frequency domain resource unit that is occupied by the fourth group of resource elements in the second carrier, the fifth group of resource elements occupies at least one frequency domain resource unit in the first carrier, the sixth group of resource elements occupies at least one frequency domain resource unit in the second carrier, and a sequence number of the frequency domain resource unit that is occupied by the fifth group of resource elements in the first carrier is the same as a sequence number of the frequency domain resource unit that is occupied by the sixth group of resource elements in the second carrier, and the frequency domain resource unit is a group of subcarriers.

According to another aspect, a signal sending method is provided, including receiving, by a terminal device, a first signal and a second signal that are sent by a network device, where subcarriers occupied by the first signal are continuous subcarriers in a first group of resource elements, subcarriers occupied by the second signal are continuous subcarriers in a second group of resource elements, a quantity of subcarriers occupied by the first signal is the same as a quantity of subcarriers occupied by the second signal, and a subcarrier spacing in the first group of resource elements is different from a subcarrier spacing in the second group of resource elements, and performing, by the terminal device, detection on the first signal and the second signal, or performing, by the terminal device, demodulation and detection on the first signal and the second signal, or performing, by the terminal device, demodulation and decoding on the first signal and the second signal.

In a possible design, the first signal and the second signal are synchronization signals, the continuous subcarriers do not include a zeroth subcarrier, the first group of resource elements and the second group of resource elements occupy a same quantity of symbols or different quantities of symbols in time domain, and occupy one symbol or at least two consecutive symbols in time domain.

In a possible design, a correspondence between a sequence number of a subcarrier in the first group of resource elements and a modulation symbol or a sequence element of the first signal is the same as a correspondence between a sequence number of a subcarrier in the second group of resource elements and a modulation symbol or a sequence element of the second signal.

In a possible design, the method further includes receiving, by the terminal device, a third signal and/or a fourth signal that are/is sent by the network device, where subcarriers occupied by the third signal are continuous subcarriers in a third group of resource elements, a subcarrier spacing in the third group of resource elements is the same as the subcarrier spacing in the first group of resource elements, subcarriers occupied by the fourth signal are continuous subcarriers in a fourth group of resource elements, a subcarrier spacing in the fourth group of resource elements is the same as a subcarrier spacing of the first group of resource elements or the third group of resource elements, the first signal is a primary synchronization signal, the third signal includes at least a secondary synchronization signal, and the fourth signal is a broadcast channel signal or system information block signal.

According to still another aspect, a network device is provided, including a processing unit, configured to determine a subcarrier location of a to-be-sent first signal and a subcarrier location of a to-be-sent second signal, where subcarriers occupied by the first signal are continuous subcarriers in a first group of resource elements, subcarriers occupied by the second signal are continuous subcarriers in a second group of resource elements, a quantity of the subcarriers occupied by the first signal is the same as a quantity of the subcarriers occupied by the second signal, and a subcarrier spacing in the first group of resource elements is different from a subcarrier spacing in the second group of resource elements, and a sending unit, configured to send the first signal at the determined subcarrier location of the first signal, and send the second signal at the determined subcarrier location of the second signal.

In a possible design, the first signal and the second signal are synchronization signals, the continuous subcarriers do not include a zeroth subcarrier, the first group of resource elements and the second group of resource elements occupy a same quantity of symbols or different quantities of symbols in time domain, and occupy one symbol or at least two consecutive symbols in time domain.

In a possible design, a correspondence between a sequence number of a subcarrier in the first group of resource elements and a modulation symbol or a sequence element of the first signal is the same as a correspondence between a sequence number of a subcarrier in the second group of resource elements and a modulation symbol or a sequence element of the second signal.

In a possible design, the processing unit is further configured to determine a subcarrier location of a to-be-sent third signal and a subcarrier location of a to-be-sent fourth signal, where subcarriers occupied by the third signal are continuous subcarriers in a third group of resource elements, subcarriers occupied by the fourth signal are continuous subcarriers in a fourth group of resource elements, a quantity of the subcarriers occupied by the third signal is the same as a quantity of the subcarriers occupied by the fourth signal, a subcarrier spacing in the third group of resource elements is the same as the subcarrier spacing in the first group of resource elements, a subcarrier spacing in the fourth group of resource elements is the same as the subcarrier spacing in the second group of resource elements, the first signal and the second signal are primary synchronization signals, and the third signal and the fourth signal include at least secondary synchronization signals.

In a possible design, a correspondence between a sequence number of a subcarrier in the third group of resource elements and a modulation symbol or a sequence element of the third signal is the same as a correspondence between a sequence number of a subcarrier in the fourth group of resource elements and a modulation symbol or a sequence element of the fourth signal.

In a possible design, the processing unit is further configured to determine a subcarrier location of a to-be-sent fifth signal and a subcarrier location of a to-be-sent sixth signal, where subcarriers occupied by the fifth signal are continuous subcarriers in a fifth group of resource elements, subcarriers occupied by the sixth signal are continuous subcarriers in a sixth group of resource elements, a quantity of the subcarriers occupied by the fifth signal is the same as a quantity of the subcarriers occupied by the sixth signal, a subcarrier spacing in the fifth group of resource elements is the same as the subcarrier spacing in the first group of resource elements and/or the third group of resource elements, a subcarrier spacing in the sixth group of resource elements is the same as the subcarrier spacing in the second group of resource elements and/or the fourth group of resource elements, and the fifth signal and the sixth signal are first broadcast channel signals or first system information block signals.

In a possible design, a location of a resource element that carries a data signal of the fifth signal and that is in the fifth group of resource elements is the same as a location of a resource element that carries a data signal of the sixth signal and that is in the sixth group of resource elements, and a location of a resource element that carries a pilot signal of the fifth signal and that is in the fifth group of resource elements is the same as a location of a resource element that carries a pilot signal of the sixth signal and that is in the sixth group of resource elements, and the resource element is a frequency domain resource in a unit symbol.

In a possible design, at least two groups of resource elements in the first group of resource elements, the third group of resource elements, and the fifth group of resource elements occupy different frequency domain resources on a same time domain resource, and at least two groups of resource elements in the second group of resource elements, the fourth group of resource elements, and the sixth group of resource elements occupies the different frequency domain resources on a same time domain resource.

In a possible design, on a time domain resource occupied by at least one group of resource elements in the first group of resource elements, the third group of resource elements, and the fifth group of resource elements, a seventh signal occupies a subcarrier in a frequency domain resource different from the frequency domain resource occupied by at least one group of resource elements in the first group of resource elements, the third group of resource elements, and the fifth group of resource elements. The seventh signal is a second broadcast channel signal or second system information block signal, and a time domain resource occupied by the seventh signal is greater than or equal to a time domain resource occupied by at least one of the first signal, the third signal, and the fifth signal.

In a possible design, the at least two groups of resource elements in the first group of resource elements, the third group of resource elements, and the fifth group of resource elements may be located at a first carrier, the at least two groups of resource elements in the second group of resource elements, the fourth group of resource elements, and the sixth group of resource elements may be located at a second carrier, and the first carrier and the second carrier occupy different frequency domain resources.

In a possible design, the first group of resource elements occupies at least one frequency domain resource unit in the first carrier, the second group of resource elements occupies at least one frequency domain resource unit in the second carrier, and a sequence number of the frequency domain resource unit that is occupied by the first group of resource elements in the first carrier is the same as a sequence number of the frequency domain resource unit that is occupied by the second group of resource elements in the second carrier, the third group of resource elements occupies at least one frequency domain resource unit in the first carrier, the fourth group of resource elements occupies at least one frequency domain resource unit in the second carrier, and a sequence number of the frequency domain resource unit that is occupied by the third group of resource elements in the first carrier is the same as a sequence number of the frequency domain resource unit that is occupied by the fourth group of resource elements in the second carrier, the fifth group of resource elements occupies at least one frequency domain resource unit in the first carrier, the sixth group of resource elements occupies at least one frequency domain resource unit in the second carrier, and a sequence number of the frequency domain resource unit that is occupied by the fifth group of resource elements in the first carrier is the same as a sequence number of the frequency domain resource unit that is occupied by the sixth group of resource elements in the second carrier, and the frequency domain resource unit is a group of subcarriers.

According to still another aspect, a terminal device is provided and includes a receiving unit, configured to receive a first signal and a second signal that are sent by a network device, where subcarriers occupied by the first signal are continuous subcarriers in a first group of resource elements, subcarriers occupied by the second signal are continuous subcarriers in a second group of resource elements, a quantity of subcarriers occupied by the first signal is the same as a quantity of subcarriers occupied by the second signal, and a subcarrier spacing in the first group of resource elements is different from a subcarrier spacing in the second group of resource elements, and a processing unit, configured to perform detection on the first signal and the second signal, or a processing unit, configured to perform demodulation and detection on the first signal and the second signal, or a processing unit, configured to perform demodulation and decoding on the first signal and the second signal.

In a possible design, the first signal and the second signal are synchronization signals, the continuous subcarriers do not include a zeroth subcarrier, the first group of resource elements and the second group of resource elements occupy a same quantity of symbols or different quantities of symbols in time domain, and occupy one symbol or at least two consecutive symbols in time domain.

In a possible design, a correspondence between a sequence number of a subcarrier in the first group of resource elements and a modulation symbol or a sequence element of the first signal is the same as a correspondence between a sequence number of a subcarrier in the second group of resource elements and a modulation symbol or a sequence element of the second signal.

In a possible design, the receiving unit is further configured to receive a third signal and/or a fourth signal that are/is sent by the network device, where subcarriers occupied by the third signal are continuous subcarriers in a third group of resource elements, a subcarrier spacing in the third group of resource elements is the same as the subcarrier spacing in the first group of resource elements, subcarriers occupied by the fourth signal are continuous subcarriers in a fourth group of resource elements, a subcarrier spacing in the fourth group of resource elements is the same as a subcarrier spacing of the first group of resource elements or the third group of resource elements, the first signal is a primary synchronization signal, the third signal includes at least a secondary synchronization signal, and the fourth signal is a broadcast channel signal or system information block signal.

According to still another aspect, an embodiment of the present invention provides a computer storage medium, configured to store a computer software instruction used by the foregoing network device, and the computer storage medium includes a program used for performing the foregoing four aspects.

According to still another aspect, an embodiment of the present invention provides a computer storage medium, configured to store a computer software instruction used by the foregoing terminal device, and the computer storage medium includes a program used for performing the foregoing four aspects.

The embodiments of the present invention provide the signal sending method, the network device, and the terminal device. The network device determines the subcarrier location of the to-be-sent first signal and the subcarrier location of the to-be-sent second signal. The subcarriers occupied by the first signal are continuous subcarriers in the first group of resource elements, the subcarriers occupied by the second signal are continuous subcarriers in the second group of resource elements, the quantity of the subcarriers occupied by the first signal is the same as the quantity of the subcarriers occupied by the second signal, and the subcarrier spacing of the first group of resource elements is different from the subcarrier spacing of the second group of resource elements. The network device sends the first signal at the determined subcarrier location of the first signal, and sends the second signal at the determined subcarrier location of the second signal. In this way, when the first signal and the second signal may be used for time-frequency synchronization and cell search, the terminal device may obtain related information that is used for cell access, so as to support the terminal device in accessing the cells with different subcarrier spacings or communicating with the network device by using the time-frequency resources with different subcarrier spacings. This can resolve a problem of how to send a signal by the network device to enable the terminal device to access a system that supports a plurality of subcarrier spacings.

BRIEF DESCRIPTION OF THE DRAWINGS

FIG. 3A and FIG. 3B are a schematic flowchart of a signal sending method according to an embodiment of the present invention;

DETAILED DESCRIPTION OF ILLUSTRATIVE EMBODIMENTS

Embodiments of the present invention may be applied to a wireless communications system, for example, are applicable to a 5G communications system, and are specifically applicable to an application scenario in which a terminal device accesses a network side in a 5G communications system. The 5G communications system may support different services, different deployment scenarios, and different spectrums. The service may be, for example, an enhanced Mobile Broadband (eMBB) service, a machine type communication (MTC) service, an ultra-reliable and low latency communications (URLLC) service, a multimedia broadcast multicast service (MBMS), or a positioning service. The deployment scenario may be, for example, an indoor hotspot scenario, a dense urban scenario, a suburban scenario, an urban macro coverage scenario, or a high-speed railway scenario. The spectrum may be, for example, any frequency range within 100 GHz.

Figure 1:
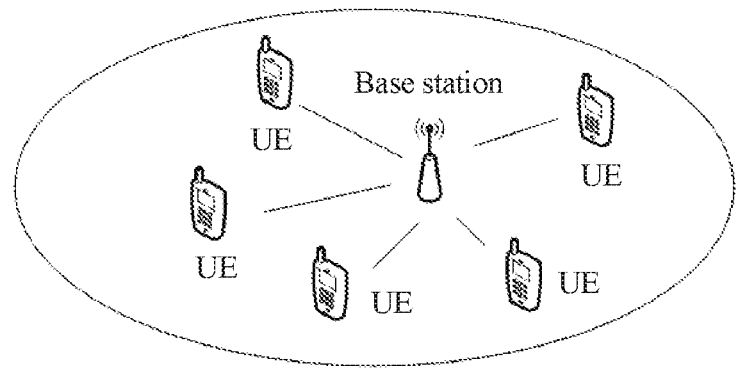
FIG. 1 is a schematic diagram of a network architecture according to an embodiment of the present invention.

An embodiment of the present invention provides a network architecture. As shown in FIG. 1, the network architecture includes a network device and a terminal device. For example, the network device may be a base station, and the terminal device may be user equipment (UE).

In this embodiment of the present invention, an example in which the network device is a base station is used. The base station is an apparatus that is deployed in a radio access network and is configured to provide a radio communication function. In a 5G communications system, a device that provides a network device function includes an evolved network device (evolved Node B, eNB), a new radio node B (gNB), a centralized unit (CU), a distributed unit, a new radio controller, and the like.

In this embodiment of the present invention, the terminal device may be any one of the following, and the terminal device may be static or mobile. The terminal device may include but is not limited to a station, a mobile station, a subscriber unit, a personal computer, a laptop computer, a tablet computer, a netbook, a terminal, a cellular phone, a handheld device, a cordless phone, a personal digital assistant (PDA), a data card, a Universal Serial Bus (USB) inserting device, a mobile Wi-Fi hotspot device (MiFi Devices), a smartwatch, smart glasses, a wireless modem, a wireless router, a wireless local loop (WLL) station, and the like.

Figure 2:
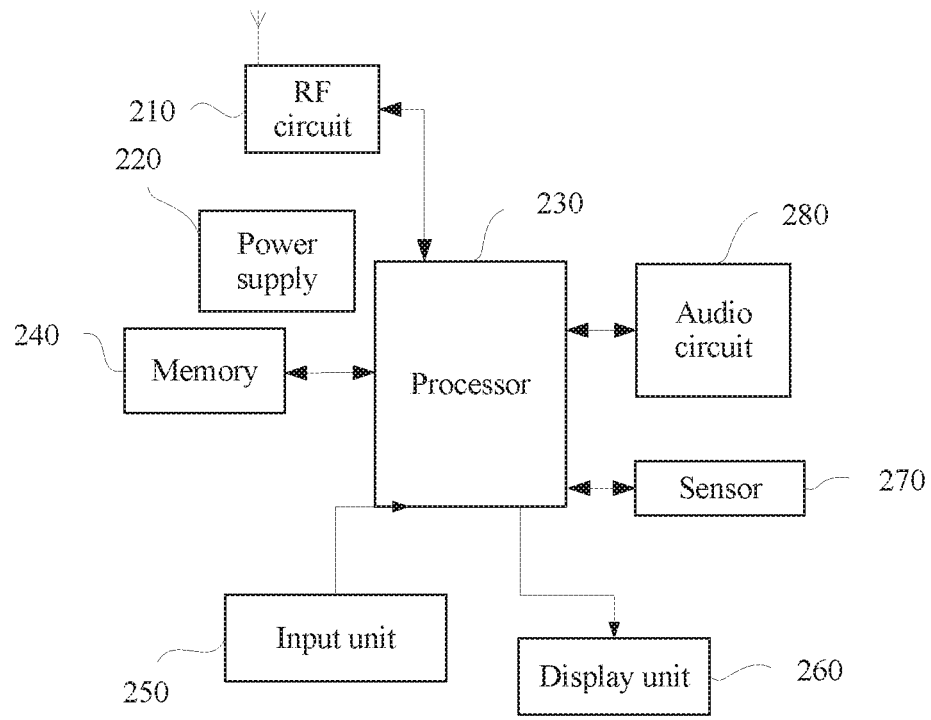
FIG. 2 is a schematic structural diagram of a terminal device according to an embodiment of the present invention.

An example in which the terminal device is a mobile phone is used. FIG. 2 is a block diagram of a partial structure of the mobile phone related to an embodiment of the present invention. Referring to FIG. 2, the mobile phone includes components such as a radio frequency (RF) circuit 210, a power supply 220, a processor 230, a memory 240, an input unit 250, a display unit 260, a sensor 270, and an audio circuit 280. A person skilled in the art may understand that the structure of the mobile phone shown in FIG. 2 does not constitute a limitation on the mobile phone, and the mobile phone may include more or fewer components than those shown in the figure, or combine some components, or have different component arrangements.

The embodiments of the present invention provide a signal sending method, a network device, and a terminal device, which are applied to a 5G communications system. When the network device sends a first signal and a second signal, the first signal is mapped to a first group of resource elements, the second signal is mapped to a second group of resource elements, and the first signal occupies continuous subcarriers in the first group of resource elements, the second signal occupies continuous subcarriers in the second group of resource elements, and subcarrier spacings in the first group of resource elements and the second group of resource elements are different, so that the 5G communications system may support the terminal device in receiving signals that are sent by the network device and that have different subcarrier spacings, to enable the terminal device to access a system that supports a plurality of subcarrier spacings.

An embodiment of the present invention provides a signal sending method. As shown in FIG. 3A and FIG. 3B, the method includes the following steps.

301. A network device determines a subcarrier location of a to-be-sent first signal and a subcarrier location of a to-be-sent second signal, where subcarriers occupied by the first signal are continuous subcarriers in a first group of resource elements, subcarriers occupied by the second signal are continuous subcarriers in a second group of resource elements, a quantity of the subcarriers occupied by the first signal is the same as a quantity of the subcarriers occupied by the second signal, a subcarrier spacing in the first group of resource elements is different from a subcarrier spacing in the second group of resource elements, and the first signal and the second signal are primary synchronization signals.

Figure 4:
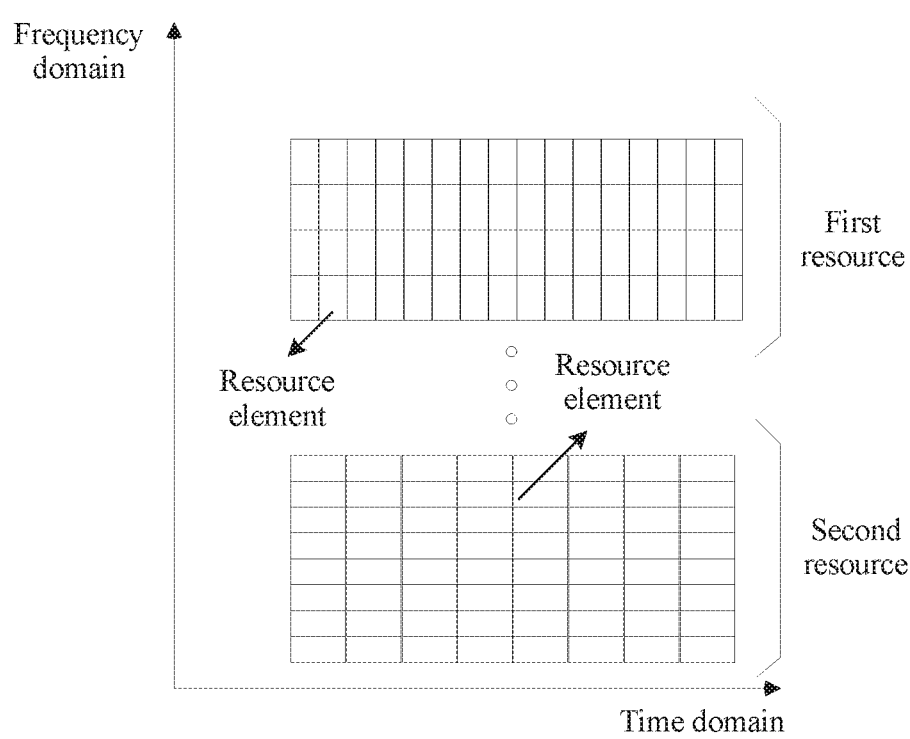
FIG. 4 is a schematic diagram of time-frequency resources with different subcarrier spacings according to an embodiment of the present invention.

Specifically, a channel resource may be divided in advance based on time domain and frequency domain. As shown in FIG. 4, for example, the channel resource includes a first resource and a second resource, the first resource includes at least one group of resource elements, and the second resource includes at least one group of resource elements. Each group of resource elements includes a plurality of resource elements. If the resource elements are divided based on a symbol length in time domain and divided based on a subcarrier in frequency domain, a resource element may be understood as a frequency domain resource in a unit of symbol length. When the network device needs to send a signal, the signal may be mapped onto a group of resource elements for sending.

Figure 5:
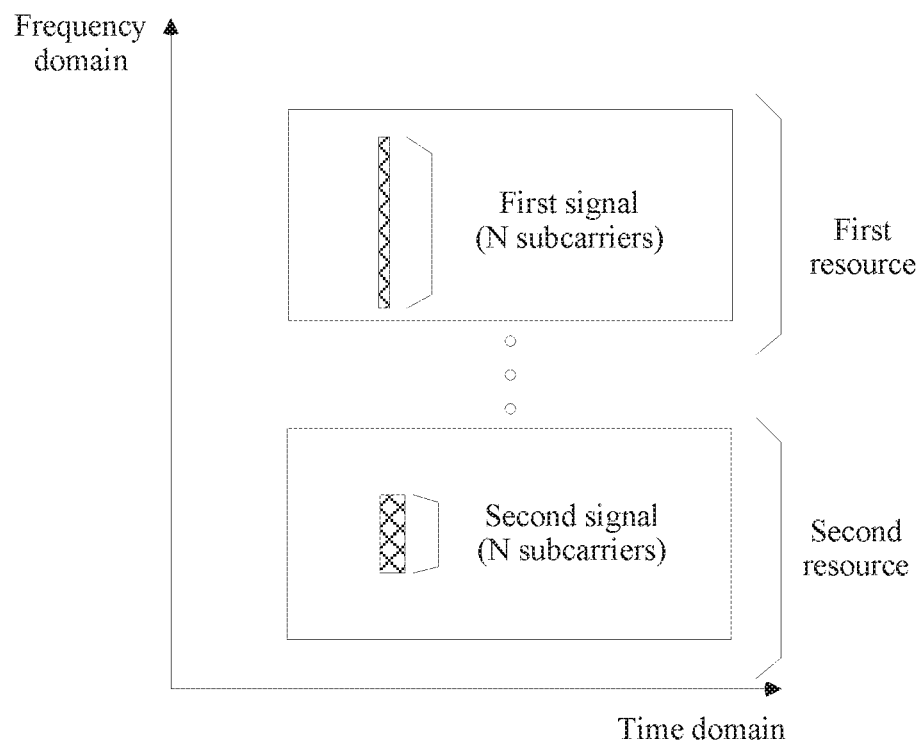
FIG. 5 is a schematic diagram of time-frequency resources that are used for sending a first signal and a second signal and that have different subcarrier spacings according to an embodiment of the present invention.

For example, when the network device needs to send a signal, the network device may determine, based on the to-be-sent signal and a type of a terminal device supported by the network device, a group of resource elements for sending the signal, that is, a specific subcarrier spacing of resources to be used for sending the signal. For example, the to-be-sent signal is a synchronization signal, the type of the terminal device supported by the network device supports a first subcarrier spacing and a second subcarrier spacing, and the first subcarrier spacing is different from the second subcarrier spacing. The network device may map an element of the first signal in the to-be-sent signal to the first group of resource elements that is not occupied in the first resource, and map an element of the second signal in the to-be-sent signal to a second group of resource elements that is not occupied in the second resource. If the first signal occupies N subcarriers on the first group of resource elements, and the second signal occupies N subcarriers on the second group of resource elements, FIG. 5 is a schematic diagram of resource occupation of the first signal and the second signal in time domain and frequency domain. The elements of the first signal and the second signal may be unmodulated sequence signals, or may be elements of a modulation symbol signal. The subcarrier spacing in the first group of resource elements is the first subcarrier spacing, and the subcarrier spacing in the second resource element is the second subcarrier spacing, that is, the subcarrier spacing in the first group of resource elements is different from the subcarrier spacing in the second group of resource elements. The subcarriers occupied by the first signal in the first group of resource elements are continuous subcarriers, and the subcarriers occupied by the second signal in the second group of resource elements are also continuous subcarriers. If the first group of resource elements or the second group of resource elements includes a zeroth subcarrier, the continuous subcarriers do not include the zeroth subcarrier. Because both the first signal and the second signal are synchronization signals, the quantity of subcarriers occupied by the first signal is the same as the quantity of subcarriers occupied by the second signal.

As shown in FIG. 5, when a subcarrier spacing is relatively small, a time domain symbol length is relatively long, on the contrary, when the subcarrier spacing is relatively large, a time domain symbol length is relatively short. The latter may enable the signal to reach the terminal device more quickly. Therefore, the first group of resource elements and the second group of resource elements may occupy a same quantity of symbols or different quantities of symbols in time domain, and occupy one symbol or at least two consecutive symbols in time domain.

Optionally, the network device determines a group of resource elements having a specific subcarrier spacing for sending the signal. A synchronization signal corresponding to a subcarrier spacing is required for synchronization between the terminal device and resources having different subcarrier spacings. Therefore, the network device sends, on a resource corresponding to each subcarrier spacing, at least one synchronization signal having a corresponding subcarrier spacing.

Further, a mapping method of the first signal in the first group of resource elements may be the same as a mapping method of the second signal in the second group of resource elements. For example, a correspondence between a sequence number of a subcarrier in the first group of resource elements and a modulation symbol or a sequence element of the first signal is the same as a correspondence between a sequence number of a subcarrier in the second group of resource elements and a modulation symbol or a sequence element of the second signal. The modulation symbol is a complex symbol that is obtained through modulation and mapping, a complex symbol is mapped to a resource element, and a sequence of the complex symbol is corresponding to a sequence number of a subcarrier corresponding to the resource element. When the sequence element may be understood as a to-be-sent and unmodulated sequence signal, for example, when the signal is a Zadoff-chu sequence signal, one element in the sequence is mapped to one resource element, and the sequence is corresponding to a sequence number of a subcarrier in which the resource element is located. When the mapping method of the first signal in the first group of resource elements is the same as the mapping method of the second signal in the second group of resource elements, an implementation of mapping between the first signal and the second signal and the resource elements may be simpler.

302. The network device determines a subcarrier location of a to-be-sent third signal and a subcarrier location of a to-be-sent fourth signal, where subcarriers occupied by the third signal are continuous subcarriers in a third group of resource elements, subcarriers occupied by the fourth signal are continuous subcarriers in a fourth group of resource elements, a quantity of the subcarriers occupied by the third signal is the same as a quantity of the subcarriers occupied by the fourth signal, a subcarrier spacing in the third group of resource elements is the same as the subcarrier spacing in the first group of resource elements, a subcarrier spacing in the fourth group of resource elements is the same as the subcarrier spacing in the second group of resource elements, and the third signal and the fourth signal include at least secondary synchronization signals.

That the network device is a base station is used as an example. When the first signal and the second signal are primary synchronization signals (PSS), the base station further needs to send at least the secondary synchronization signal (SSS), so that the terminal device can detect the primary synchronization signal accurately and quickly, and perform detection on the secondary synchronization signal under the premise that the primary synchronization signal is known, thereby completing time-frequency synchronization with the base station based on the primary synchronization signal, and obtaining a cell ID based on the primary synchronization signal and/or the secondary synchronization signal. Further, a complete or partial system frame number may be obtained. Therefore, when the subcarrier locations of the first signal and the second signal are determined, the subcarrier locations of the third signal and the fourth signal that are at least the secondary synchronization signals further need to be determined. In an example, the base station may further send a third type of synchronization signal. The third type of synchronization signal may be used to locate a subframe or a symbol sequence number, or be used to locate a lobe sequence number.

Similar to step 301, the subcarriers occupied by the third signal may be continuous subcarriers in the third group of resource elements, the subcarriers occupied by the fourth signal may be continuous subcarriers in the fourth group of resource elements, and the continuous subcarriers do not include the zeroth subcarrier. The third signal and the fourth signal are at least secondary synchronization signals, and the quantity of subcarriers occupied by the third signal is the same as the quantity of subcarriers occupied by the fourth signal. If both the first signal and the third signal are specific to a same type of terminal device, the subcarrier spacing in the third group of resource elements is the same as the subcarrier spacing in the first group of resource elements. If the second signal and the fourth signal are specific to a same type of terminal device, the subcarrier spacing in the second group of resource elements is the same as the subcarrier spacing in the fourth group of resource elements. Therefore, the subcarrier spacing in the third group of resource elements is different from the subcarrier spacing in the fourth group of resource elements. For the terminal device, the received primary synchronization signal and a signal including at least the secondary synchronization signal are successively the first signal and the third signal, or the received primary synchronization signal and a signal including at least the secondary synchronization signal are successively the second signal and the fourth signal.

Similar to step 301, the third group of resource elements and the fourth group of resource elements may occupy a same quantity of symbols or different quantities of symbols in time domain, and occupy one symbol or at least two consecutive symbols in time domain. Correspondingly, a correspondence between a sequence number of a subcarrier in the third group of resource elements and a modulation symbol or a sequence element of the third signal is the same as a correspondence between a sequence number of a subcarrier in the fourth group of resource elements and a modulation symbol or a sequence element of the fourth signal.

303. The network device determines a subcarrier location of a to-be-sent fifth signal and a subcarrier location of a to-be-sent sixth signal, where subcarriers occupied by the fifth signal are continuous subcarriers in a fifth group of resource elements, subcarriers occupied by the sixth signal are continuous subcarriers in a sixth group of resource elements, a quantity of the subcarriers occupied by the fifth signal is the same as a quantity of the subcarriers occupied by the sixth signal, a subcarrier spacing in the fifth group of resource elements is the same as the subcarrier spacing in the first group of resource elements and/or the third group of resource elements, a subcarrier spacing in the sixth group of resource elements is the same as the subcarrier spacing in the second group of resource elements and/or the fourth group of resource elements, and the fifth signal and the sixth signal are first broadcast channel signals or first system information block (System Information Block, SIB) signals.

That the network device is a base station is used as an example. Before the terminal device accesses a cell, when the base station sends the primary synchronization signal and the secondary synchronization signal to enable the terminal device to perform cell search, the base station further needs to send the first broadcast channel signal or the first system information block signal, to enable the terminal device to obtain necessary information required by a subsequent access process. For example, the first broadcast channel signal or the first system information block signal includes measurement pilot sending information and random access configuration information. Therefore, the base station further needs to send the fifth signal and the sixth signal that occupy different subcarrier spacings. The fifth signal and the sixth signal are the first broadcast channel signals or the first system information block signals. If a subcarrier spacing occupied by the fifth signal and subcarrier spacings occupied by the first signal and the third signal are corresponding to a same type of terminal device, when the subcarriers occupied by the fifth signal are continuous subcarriers in the fifth group of resource elements, the subcarrier spacing of the fifth group of resource elements is the same as the subcarrier spacing of the first group of resource elements and the third group of resource elements. If a subcarrier spacing occupied by the sixth signal and subcarrier spacings occupied by the second signal and the fourth signal are corresponding to another same type of terminal device, when the subcarriers occupied by the sixth signal are continuous subcarriers in the sixth group of resource elements, the subcarrier spacing of the sixth group of resource elements is the same as the subcarrier spacings of the second group of resource elements and the fourth group of resource elements, that is, the subcarrier spacing of the fifth group of resource elements is different from the subcarrier spacing of the sixth group of resource elements.

Similar to step 301 and step 302, the fifth group of resource elements and the sixth group of resource elements may occupy a same quantity of symbols or different quantities of symbols in time domain, and occupy one symbol or at least two consecutive symbols in time domain. For ease of implementation, when the fifth signal and the sixth signal are the first broadcast channel signals or the first system information block signals, because the fifth signal and the sixth signal not only include a sequence signal, that is, a data signal, but also include a pilot signal, a location of a resource element that carries the data signal of the fifth signal and that is in the fifth group of resource elements is the same as a location of a resource element that carries the data signal of the sixth signal and that is in the sixth group of resource elements, and a location of a resource element that carries the pilot signal of the fifth signal and that is in the fifth group of resource elements is the same as a location of a resource element that carries the pilot signal of the sixth signal and that is in the sixth group of resource elements.

Optionally, at least two groups of resource elements in the first group of resource elements, the third group of resource elements, and the fifth group of resource elements occupy different frequency domain resources on a same time domain resource, and at least two groups of resource elements in the second group of resource elements, the fourth group of resource elements, and the sixth group of resource elements occupy the different frequency domain resources on a same time domain resource. That is, at least two signals in the first signal, the third signal, and the fifth signal are simultaneously sent, and at least two signals in the second signal, the fourth signal, and the sixth signal are simultaneously sent.

Optionally, in a possible implementation, when the base station sends the first broadcast channel signal or the first system information block signal by using the fifth signal, a second broadcast channel signal or a second system information block signal may be simultaneously sent. For example, the first broadcast channel signal or the first system information block signal carries related information such as cell and/or lobe measurement pilot information, and the second broadcast channel signal or the second system information block signal carries other information, for example, random access configuration information. Therefore, when the base station sends the first signal, the third signal, and the fifth signal, the base station further needs to send a seventh signal. The seventh signal is the second broadcast channel signal or the second system information block signal, and a time domain resource occupied by the seventh signal is greater than or equal to a time domain resource occupied by at least one of the first signal, the third signal, and the fifth signal. On a time domain resource occupied by at least one group of resource elements in the first group of resource elements, the third group of resource elements, and the fifth group of resource elements, the seventh signal occupies a subcarrier in a frequency domain resource different from the frequency domain resource occupied by at least one group of resource elements in the first group of resource elements, the third group of resource elements, and the fifth group of resource elements. In other words, the seventh signal occupies a subcarrier in a remaining frequency domain resource of a frequency domain resource of the first subcarrier spacing.

Optionally, using a carrier as a unit, one carrier includes a plurality of subcarriers, and the at least two groups of resource elements in the first group of resource elements, the third group of resource elements, and the fifth group of resource elements may be located at a first carrier, the at least two groups of resource elements in the second group of resource elements, the fourth group of resource elements, and the sixth group of resource elements may be located at a second carrier, and the first carrier and the second carrier occupy different frequency domain resources. That is, each carrier includes a plurality of groups of resource elements.

Optionally, if each carrier includes a plurality of frequency domain resource units, each frequency domain resource unit is a group of subcarriers, and one group of subcarriers includes at least two subcarriers. The first group of resource elements may occupy at least one frequency domain resource unit in the first carrier, the second group of resource elements may occupy at least one frequency domain resource unit in the second carrier, and a sequence number of the frequency domain resource unit that is occupied by the first group of resource elements in the first carrier is the same as a sequence number of the frequency domain resource unit that is occupied by the second group of resource elements in the second carrier. Similarly, the third group of resource elements may occupy at least one frequency domain resource unit in the first carrier, the fourth group of resource elements may occupy at least one frequency domain resource unit in the second carrier, and a sequence number of the frequency domain resource unit that is occupied by the third group of resource elements in the first carrier is the same as a sequence number of the frequency domain resource unit that is occupied by the fourth group of resource elements in the second carrier, the fifth group of resource elements may occupy at least one frequency domain resource unit in the first carrier, the sixth group of resource elements may occupy at least one frequency domain resource unit in the second carrier, and a sequence number of the frequency domain resource unit that is occupied by the fifth group of resource elements in the first carrier is the same as a sequence number of the frequency domain resource unit that is occupied by the sixth group of resource elements in the second carrier.

Optionally, the quantity of subcarriers included in the first group of resource elements and the quantity of subcarriers included in the second group of resource elements may be both 72, 48, 96, or another value, and this is not limited in this application. Similarly, the quantity of subcarriers included in the third group of resource elements and the quantity of subcarriers included in the fourth group of resource elements may be both 72, 48, 96, or another value, and this is not limited in this application. Similarly, the quantity of subcarriers included in the fifth group of resource elements and the quantity of subcarriers included in the sixth group of resource elements may be both 72, 144, 288, or another value, and this is not limited in this application.

The quantity of subcarriers that are in the first group of resource elements and that are occupied by the first signal is less than or equal to a total quantity of subcarriers in the first group of resource elements, and the quantity of subcarriers that are in the second group of resource elements and that are occupied by the second signal is less than or equal to a total quantity of subcarriers in the second group of resource elements. Similarly, the quantity of subcarriers that are in the third group of resource elements and that are occupied by the third signal is less than or equal to a total quantity of subcarriers in the third group of resource elements, and the quantity of subcarriers that are in the fourth group of resource elements and that are occupied by the fourth signal is less than or equal to a total quantity of subcarriers in the fourth group of resource elements, the quantity of subcarriers that are in the fifth group of resource elements and that are occupied by the fifth signal is less than or equal to a total quantity of subcarriers in the fifth group of resource elements, and the quantity of subcarriers that are in the sixth group of resource elements and that are occupied by the sixth signal is less than or equal to a total quantity of subcarriers in the sixth group of resource elements.

304. The network device sends the first signal at the determined subcarrier location of the first signal, sends the second signal at the determined subcarrier location of the second signal, sends the third signal at the determined subcarrier location of the third signal, sends the fourth signal at the determined subcarrier location of the fourth signal, sends a fifth signal at the determined subcarrier location of the fifth signal, and sends the sixth signal at the determined subcarrier location of the sixth signal.

305. The terminal device performs synchronization or cell search based on the first signal and/or the third signal, and receives the fifth signal for demodulation and decoding, or the terminal device performs synchronization or cell search based on the second signal and/or the fourth signal, and receives the sixth signal for demodulation and decoding.

In a possible design, because the subcarrier spacings of the first signal, the third signal, and the fifth signal are the same, the subcarrier spacings of the second signal, the fourth signal, and the sixth signal are the same, the subcarrier spacings of the first signal and the second signal are different, the first signal and the second signal are both the primary synchronization signals, the third signal and the fourth signal include at least the secondary synchronization signals, and the fifth signal and the sixth signal include at least the first broadcast channel signals or the first system information block signals, if the terminal device supports the subcarrier spacing of the first signal, the terminal device may receive the first signal, the third signal, and the fifth signal, or if the terminal device supports the subcarrier spacing of the second signal, the terminal device may receive the second signal, the fourth signal, and the sixth signal.

That the terminal device receives the first signal, the third signal, and the fifth signal is used as an example. If the first signal is the primary synchronization signal, the third signal is the secondary synchronization signal, the fifth signal is the first broadcast channel signal or the first system information block signal, the primary synchronization signal and/or the secondary synchronization signal are unmodulated sequences, and the fifth signal is a coded and modulated signal, the terminal device may perform sequence detection on the first signal and/or the third signal to implement time-frequency synchronization with the network device, or may obtain the cell ID based on the first signal and/or the third signal to complete cell search. Further, the terminal device may also obtain the complete or partial system frame number, and demodulate and decode the fifth signal, so as to obtain the necessary information required by the subsequent access process. For example, the first broadcast channel signal or the first system information block signal includes the parameters such as the measurement pilot sending information and the random access configuration information, so that the terminal device may continue to perform the subsequent access process to access a network in which the base station is located. Alternatively, the first signal and the second signal may be modulation sequences, and in this case, the terminal device needs to perform demodulation and sequence detection on the first signal and the third signal.

In another possible design, the terminal device may alternatively receive the first signal, the second signal, the third signal, and the fifth signal. The first signal and the second signal are primary synchronization signals, the subcarrier spacing of the first signal is different from the subcarrier spacing of the second signal, the third signal may be at least the secondary synchronization signal, and the fifth signal may be the first broadcast channel signal or the first system information block signal, for example, the first broadcast channel signal or the first system information block signal includes the parameters such as the measurement pilot sending information and the random access configuration information. In this case, the terminal device may perform time-frequency synchronization based on the first signal and the second signal, perform cell search based on the first signal and/or the third signal and the fifth signal, and obtain related information for subsequent cell access. Likewise, the terminal device may alternatively receive the first signal, the second signal, the fourth signal, and the sixth signal, perform time-frequency synchronization based on the first signal and the second signal, perform cell search based on the second signal and/or the fourth signal and the sixth signal, and obtain related information for subsequent cell access.

In still another possible design, the terminal device may alternatively receive the first signal, the second signal, the third signal, the fourth signal, the fifth signal, and the sixth signal. The first signal and the second signal are the primary synchronization signals, the third signal and the fourth signal may be at least the secondary synchronization signals, and the fifth signal and the sixth signal may be the first broadcast channel signal or the first system information block signal. The subcarrier spacings of the first signal, the third signal, and the fifth signal are the same, the subcarrier spacings of the second signal, the fourth signal, and the sixth signal are the same, and the subcarrier spacings of the first signal and the second signal are different. The terminal device may perform time-frequency synchronization and/or cell search based on the first signal and/or the third signal and the second signal and/or the fourth signal, and obtain the information for subsequent cell access based on the fifth signal and the sixth signal, so that the terminal device may continue to perform the subsequent access process to access the cell.

In addition, in the foregoing three possible designs, the terminal may further receive a seventh signal sent by the network device. The seventh signal includes the second broadcast channel signal or the second system information block signal, and the second broadcast channel signal or the second system information block signal carries other information, for example, the random access configuration information.

This embodiment of the present invention provides a signal sending method. The network device determines the subcarrier location of the to-be-sent first signal and the subcarrier location of the to-be-sent second signal. The subcarriers occupied by the first signal are continuous subcarriers in the first group of resource elements, the subcarriers occupied by the second signal are continuous subcarriers in the second group of resource elements, the quantity of the subcarriers occupied by the first signal is the same as the quantity of the subcarriers occupied by the second signal, and the subcarrier spacing of the first group of resource elements is different from the subcarrier spacing of the second group of resource elements. The network device sends the first signal at the determined subcarrier location of the first signal, and sends the second signal at the determined subcarrier location of the second signal. In this way, when the first signal and the second signal may be used for time-frequency synchronization and cell search, the terminal device may obtain related information that is used to access a network in which the cell is located, so as to support the terminal device in accessing the cells with different subcarrier spacings or communicating with the network device by using the time-frequency resources with different subcarrier spacings. This can resolve a problem of how to send the signal by the network device to enable the terminal device to access a system that supports a plurality of subcarrier spacings.

The foregoing has mainly described the solutions provided in the embodiments of the present invention from the perspective of interaction between network elements. It may be understood that, to implement the foregoing functions, the network elements, such as the network device and the terminal device, include a corresponding hardware structure and/or software module that is used to perform each function. A person of ordinary skill in the art should easily be aware that, in combination with the examples described in the embodiments disclosed in this specification, unit and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present application.

In the embodiments of the present invention, function modules of the network device and the terminal device may be divided based on the foregoing method example. For example, each function module may be divided based on each function, or two or more functions may be integrated into one processing module. The integrated module may be implemented in a form of hardware, or may be implemented in a form of a software functional module. It should be noted that the module division in the embodiments of the present invention is an example, and is merely logical function division. There may be another division manner in an actual implementation.

Figure 6:
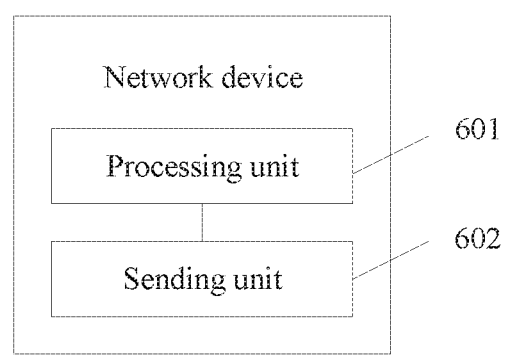
FIG. 6 is a schematic structural diagram of a network device according to an embodiment of the present invention.

When each function module is obtained through division based on each corresponding function, FIG. 6 is a possible schematic structural diagram of the network device in the foregoing embodiments. The network device includes a processing unit 601 and a sending unit 602. The processing unit 601 is configured to support the network device in performing the processes 301 to 303 in FIG. 3A, and the sending unit 602 is configured to support the network device in performing the process 304 in FIG. 3B. All related content of each step in the foregoing method embodiment may be cited in function descriptions of a corresponding function module, and details are not described herein again.

Figure 7:
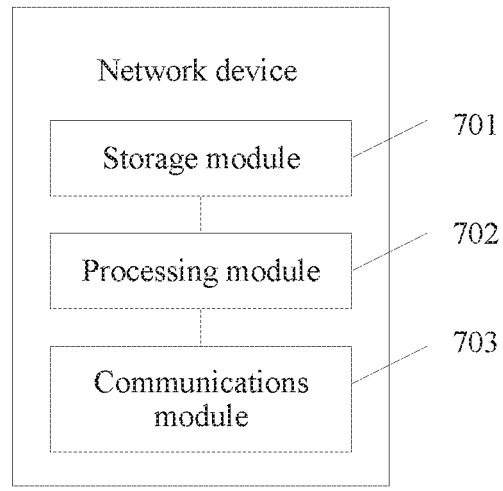
FIG. 7 is a schematic structural diagram of a network device according to an embodiment of the present invention.

When an integrated unit is used, FIG. 7 is a possible schematic structural diagram of the network device in the foregoing embodiments. The network device includes a processing module 702 and a communications module 703. The processing module 702 is configured to control and manage an action of the network device. For example, the processing module 702 is configured to support the network device in performing the processes 301 to 303 in FIG. 3A, and/or is configured to perform another process of the technology described in this specification. The communications module 703 is configured to support the network device in communicating with another network entity, for example, communicating with function modules or network entities shown in FIG. 1 and FIG. 2. The network device may further include a storage module 701, configured to store program code and data of the network device.

The processing module 702 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The controller/processor may implement or execute various example logical blocks, modules, and circuits described with reference to content disclosed in the present application. Alternatively, the processor may be a combination of processors implementing a computing function, for example, a combination of one or more microprocessors, or a combination of the DSP and a microprocessor. The communications module 703 may be a transceiver, a transceiver circuit, a communications interface, or the like. The storage module 701 may be a memory.

Figure 8:
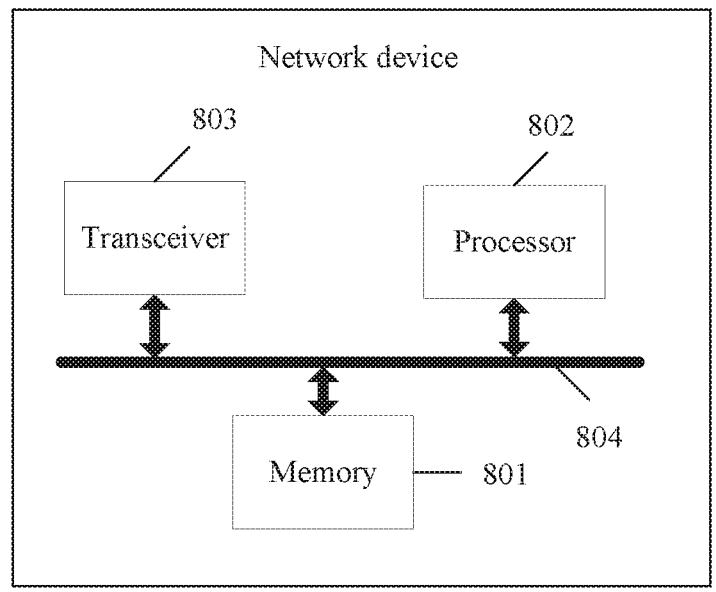
FIG. 8 is a schematic structural diagram of a network device according to an embodiment of the present invention.

When the processing module 702 is a processor, the communications module 703 is a transceiver, and the storage module 701 is a memory, the network device used in this embodiment of the present invention may be the network device shown in FIG. 8.

As shown in FIG. 8, the network device includes a processor 802, a transceiver 803, a memory 801, and a bus 804. The transceiver 803, the processor 802, and the memory 801 are interconnected by using the bus 804. The bus 804 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 8, but this does not mean that there is only one bus or only one type of bus.

Figure 9:
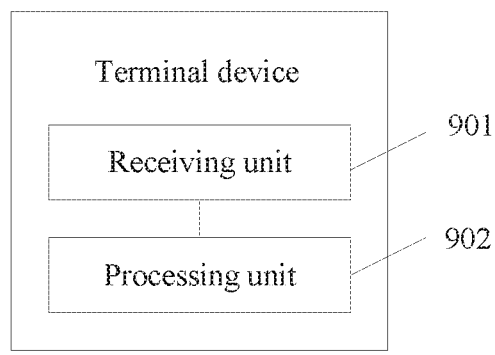
FIG. 9 is a schematic structural diagram of a terminal device according to an embodiment of the present invention.

When each function module is obtained through division based on each corresponding function, FIG. 9 is a possible schematic structural diagram of the terminal device in the foregoing embodiments. The terminal device includes a receiving unit 901 and a processing unit 902. The processing unit 902 is configured to support the terminal device in performing the process 305 in FIG. 3B, and the receiving unit 901 is configured to support the terminal device in receiving the signals sent by the network device in the process 304 in FIG. 3B. All related content of each step in the foregoing method embodiment may be cited in function descriptions of a corresponding function module, and details are not described herein again.

Figure 10:
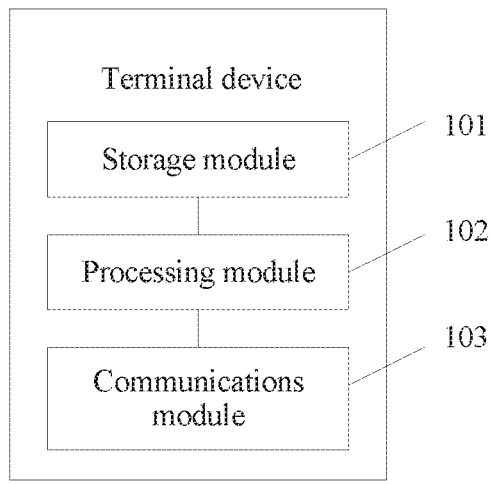
FIG. 10 is a schematic structural diagram of a terminal device according to an embodiment of the present invention.

When an integrated unit is used, FIG. 10 is a possible schematic structural diagram of the terminal device in the foregoing embodiments. The terminal device includes a processing module 102 and a communications module 103. The processing module 102 is configured to control and manage an action of the terminal device. For example, the processing module 102 is configured to support the terminal device in performing the process 305 in FIG. 3B, and/or is configured to perform another process of the technology described in this specification. The communications module 103 is configured to support the terminal device in communicating with another network entity, for example, communicating with function modules or network entities shown in FIG. 1. The terminal device may further include a storage module 101, configured to store program code and data of the terminal device.

The processing module 102 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The controller/processor may implement or execute various example logical blocks, modules, and circuits described with reference to content disclosed in the present application. Alternatively, the processor may be a combination of processors implementing a computing function, for example, a combination of one or more microprocessors, or a combination of the DSP and a microprocessor. The communications module 103 may be a transceiver, a transceiver circuit, a communications interface, or the like. The storage module 101 may be a memory.

Figure 11:
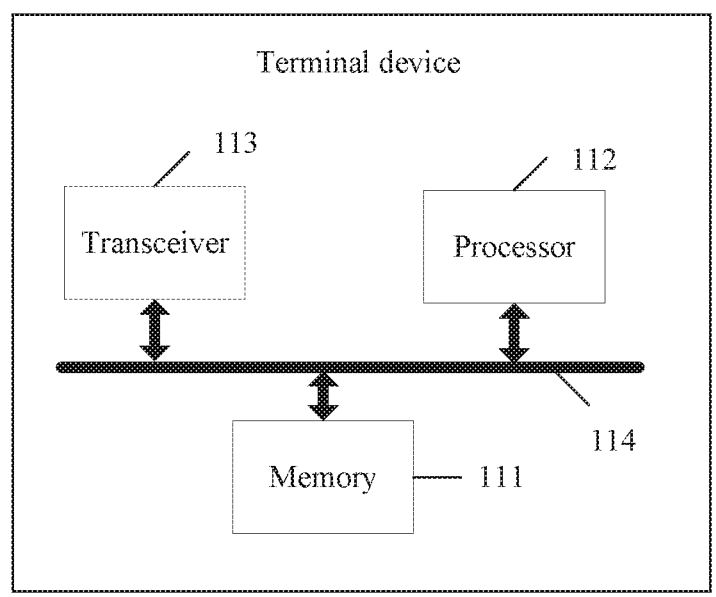
FIG. 11 is a schematic structural diagram of a terminal device according to an embodiment of the present invention.

When the processing module 102 is a processor, the communications module 103 is a transceiver, and the storage module 101 is a memory, the terminal device used in this embodiment of the present invention may be the terminal device shown in FIG. 11.

As shown in FIG. 11, the terminal device includes a processor 112, a transceiver 113, a memory 111, and a bus 114. The transceiver 113, the processor 112, and the memory 111 may be interconnected by using the bus 114. The bus 114 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 11, but this does not mean that there is only one bus or only one type of bus.

Method or algorithm steps described in combination with the content disclosed in the present application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present application may be implemented by hardware, software, firmware, or any combination thereof. When the embodiments of the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

The invention claimed is:

1. A method, comprising:
receiving, by a terminal device from a network device, a first primary synchronization signal, a first secondary synchronization signal and a first signal, wherein:
the first signal comprises first broadcast channel signals or first system information block signals;
first subcarriers occupied by the first primary synchronization signal are continuous subcarriers in a first group of resource elements;
second subcarriers occupied by the first secondary synchronization signal are continuous subcarriers in a second group of resource elements;
third subcarriers occupied by the first signal are continuous subcarriers in a third group of resource elements; and
two groups of resource elements in the first group of resource elements, the second group of resource elements, and the third group of resource elements occupy different frequency domain resources on a same time domain resource.

2. The method according to claim 1, wherein the first subcarriers exclude a zeroth subcarrier.

3. The method according to claim 1, wherein the method further comprises:
receiving, by the terminal device from the network device, a second primary synchronization signal, a second secondary synchronization signal and a second signal, wherein:
the second signal comprises second broadcast channel signals or second system information block signals;
fourth subcarriers occupied by the second primary synchronization signal are continuous subcarriers in a fourth group of resource elements;
fifth subcarriers occupied by the second secondary synchronization signal are continuous subcarriers in a fifth group of resource elements;
sixth subcarriers occupied by the second signal are continuous subcarriers in a sixth group of resource elements; and
two groups of resource elements in the fourth group of resource elements, the fifth group of resource elements and the sixth group of resource elements occupy different frequency domain resources on a same time domain resource.

4. The method according to claim 3, wherein:
a quantity of the first subcarriers is the same as a quantity of the fourth subcarriers;
a quantity of the second subcarriers is the same as a quantity of the fifth subcarriers;
a quantity of the third subcarriers is the same as a quantity of the sixth subcarriers;
a subcarrier spacing in the third group of resource elements and a subcarrier spacing in the second group of resource elements are the same as the subcarrier spacing in the first group of resource elements;
a subcarrier spacing in the sixth group of resource elements and a subcarrier spacing in the fifth group of resource elements are the same as the subcarrier spacing in the fourth group of resource elements;
an index of a symbol occupied by the first group of resource elements is the same as an index of a symbol occupied by the fourth group of resource elements; and
a subcarrier spacing in the first group of resource elements is different from a subcarrier spacing in the fourth group of resource elements.

5. The method according to claim 3, wherein:
a first location of a first resource element is the same as a second location of a second resource element, the first resource element carries a data signal of the first signal, the first resource element is in the third group of resource elements, the second resource element carries a data signal of the second signal, the second resource element is in the sixth group of resource elements; and
a third location of a third resource element is the same as a fourth location of a fourth resource element, the third resource element carries a pilot signal of the first signal, the third resource element is in the third group of resource elements, the fourth resource element carries a pilot signal of the second signal, the fourth resource element is in the sixth group of resource elements, and wherein each of the first, second, third, and fourth resource elements is a frequency domain resource in a unit symbol.

6. The method according to claim 3, wherein:
a first correspondence exists between a sequence number of a subcarrier in the first group of resource elements and a sequence element of the first primary synchronization signal, and a second correspondence exists between a sequence number of a subcarrier in the fourth group of resource elements and a sequence element of the second primary synchronization signal; and
a third correspondence exists between a sequence number of a subcarrier in the second group of resource elements and a sequence element of the first secondary synchronization signal, and a fourth correspondence exists between a sequence number of a subcarrier in the fifth group of resource elements and a sequence element of the second secondary synchronization signal.

7. The method according to claim 3, wherein two groups of resource elements in the first group of resource elements, the second group of resource elements, and the third group of resource elements are located at a first carrier, wherein two groups of resource elements in the fourth group of resource elements, the fifth group of resource elements, and the sixth group of resource elements are located at a second carrier, and wherein the first carrier and the second carrier occupy different frequency domain resources.

8. An apparatus, comprising:
a communication interface;
a processor; and
a non-transitory computer-readable storage medium storing a program to be executed by the processor, the program including instructions to:
  receive, from a network device through the communication interface, a first primary synchronization signal, a first secondary synchronization signal and a first signal; and
  process the first primary synchronization signal, the first secondary synchronization signal, and the first signal; wherein:
    the first signal comprises first broadcast channel signals or first system information block signals;
    first subcarriers occupied by the first primary synchronization signal are continuous subcarriers in a first group of resource elements;
    second subcarriers occupied by the first secondary synchronization signal are continuous subcarriers in a second group of resource elements;
    third subcarriers occupied by the first signal are continuous subcarriers in a third group of resource elements; and
    two groups of resource elements in the first group of resource elements, the second group of resource elements, and the third group of resource elements occupy different frequency domain resources on a same time domain resource.

9. The apparatus according to claim 8, wherein the first subcarriers exclude a zeroth subcarrier.

10. The apparatus according to claim 8, wherein the program further includes instructions to:
receive, from the network device through the communication interface, a second primary synchronization signal, a second secondary synchronization signal and a second signal, wherein:
  the second signal comprises second broadcast channel signals or second system information block signals;
  fourth subcarriers occupied by the second primary synchronization signal are continuous subcarriers in a fourth group of resource elements;
  fifth subcarriers occupied by the second secondary synchronization signal are continuous subcarriers in a fifth group of resource elements;
  sixth subcarriers occupied by the second signal are continuous subcarriers in a sixth group of resource elements; and
  two groups of resource elements in the fourth group of resource elements, the fifth group of resource elements, and the sixth group of resource elements occupy different frequency domain resources on a same time domain resource.

11. The apparatus according to claim 10, wherein:
a quantity of the first subcarriers is the same as a quantity of the fourth subcarriers;
a quantity of the second subcarriers is the same as a quantity of the fifth subcarriers;
a quantity of the third subcarriers is the same as a quantity of the sixth subcarriers;
a subcarrier spacing in the third group of resource elements and a subcarrier spacing in the second group of resource elements are the same as the subcarrier spacing in the first group of resource elements;
a subcarrier spacing in the sixth group of resource elements and a subcarrier spacing in the fifth group of resource elements are the same as the subcarrier spacing in the fourth group of resource elements;
an index of a symbol occupied by the first group of resource elements is the same as an index of a symbol occupied by the fourth group of resource elements; and
a subcarrier spacing in the first group of resource elements is different from a subcarrier spacing in the fourth group of resource elements.

12. The apparatus according to claim 10, wherein:
a first location of a first resource element is the same as a second location of a second resource element, the first resource element carries a data signal of the first signal, the first resource element is in the third group of resource elements, the second resource element carries a data signal of the second signal, the second resource element is in the sixth group of resource elements; and
a third location of a third resource element is the same as a fourth location of a fourth resource element, the third resource element carries a pilot signal of the second signal, the third resource element is in the third group of resource elements, the fourth resource element carries a pilot signal of the second signal, the fourth resource element is in the sixth group of resource elements, and wherein each of the first, second, third, and fourth resource elements is a frequency domain resource in a unit symbol.

13. The apparatus according to claim 10, wherein:
a first correspondence exists between a sequence number of a subcarrier in the first group of resource elements and a sequence element of the first primary synchronization signal, and a second correspondence exists between a sequence number of a subcarrier in the fourth group of resource elements and a sequence element of the second primary synchronization signal; and
a third correspondence exists between a sequence number of a subcarrier in the second group of resource elements and a sequence element of the first secondary synchronization signal, and a fourth correspondence exists between a sequence number of a subcarrier in the fifth group of resource elements and a sequence element of the second secondary synchronization signal.

14. The apparatus according to claim 10, wherein two groups of resource elements in the first group of resource elements, the second group of resource elements, and the third group of resource elements are located at a first carrier, wherein two groups of resource elements in the fourth group of resource elements, the fifth group of resource elements, and the sixth group of resource elements are located at a second carrier, and wherein the first carrier and the second carrier occupy different frequency domain resources.

15. A communication system, comprising:
a network device; and
a terminal device;
wherein the network device is configured to send a first primary synchronization signal, a first secondary synchronization signal and a first signal, and the terminal device is configured to receive the first primary synchronization signal, the first secondary synchronization signal and the first signal; and wherein:
  the first signal comprises first broadcast channel signals or first system information block signals;
  first subcarriers occupied by the first primary synchronization signal are continuous subcarriers in a first group of resource elements;

second subcarriers occupied by the first secondary synchronization signal are continuous subcarriers in a second group of resource elements;

third subcarriers occupied by the first signal are continuous subcarriers in a third group of resource elements; and two groups of resource elements in the first group of resource elements, the second group of resource elements, and the third group of resource elements occupy different frequency domain resources on a same time domain resource.

16. The system according to claim 15, wherein the first subcarriers exclude a zeroth subcarrier.

17. The system according to claim 15, wherein the network device is further configured to send a second primary synchronization signal, a second secondary synchronization signal and a second signal, and the terminal device is configured to receive the second primary synchronization signal, the second secondary synchronization signal and the second signal; and wherein:

the second signal comprises second broadcast channel signals or second system information block signals;

fourth subcarriers occupied by the second primary synchronization signal are continuous subcarriers in a fourth group of resource elements;

fifth subcarriers occupied by the second secondary synchronization signal are continuous subcarriers in a fifth group of resource elements;

sixth subcarriers occupied by the second signal are continuous subcarriers in a sixth group of resource elements; and two groups of resource elements in the fourth group of resource elements, the fifth group of resource elements, and the sixth group of resource elements occupy different frequency domain resources on a same time domain resource.

18. The system according to claim 17, wherein:

a quantity of the first subcarriers is the same as a quantity of the fourth subcarriers;

a quantity of the second subcarriers is the same as a quantity of the fifth subcarriers;

a quantity of the third subcarriers is the same as a quantity of the sixth subcarriers;

a subcarrier spacing in the third group of resource elements and a subcarrier spacing in the second group of resource elements are the same as the subcarrier spacing in the first group of resource elements;

a subcarrier spacing in the sixth group of resource elements and a subcarrier spacing in the fifth group of resource elements are the same as the subcarrier spacing in the fourth group of resource elements;

an index of a symbol occupied by the first group of resource elements is the same as an index of a symbol occupied by the fourth group of resource elements; and a subcarrier spacing in the first group of resource elements is different from a subcarrier spacing in the fourth group of resource elements.

19. The system according to claim 17, wherein:

a first location of a first resource element is the same as a second location of a second resource element, the first resource element carries a data signal of the first signal, the first resource element is in the second group of resource elements, the second resource element carries a data signal of the second signal, the second resource element is in the sixth group of resource elements; and a third location of a third resource element is the same as a fourth location of a fourth resource element, the third resource element carries a pilot signal of the first signal, the third resource element is in the third group of resource elements, the fourth resource element carries a pilot signal of the second signal, the fourth resource element is in the sixth group of resource elements, and wherein each of the first, second, third, and fourth resource elements is a frequency domain resource in a unit symbol.

20. The system according to claim 17, wherein:

a first correspondence exists between a sequence number of a subcarrier in the first group of resource elements and a sequence element of the first primary synchronization signal, and a second correspondence exists between a sequence number of a subcarrier in the fourth group of resource elements and a sequence element of the second primary synchronization signal; and a third correspondence exists between a sequence number of a subcarrier in the second group of resource elements and a sequence element of the first secondary synchronization signal, and a fourth correspondence exists between a sequence number of a subcarrier in the fifth group of resource elements and a sequence element of the second secondary synchronization signal.

* * * * *